United States Patent
Duron et al.

(10) Patent No.: US 7,865,766 B2
(45) Date of Patent: Jan. 4, 2011

(54) PROVIDING INCREASED AVAILABILITY OF I/O DRAWERS DURING CONCURRENT I/O HUB REPAIR

(75) Inventors: Mike C. Duron, Pflugerville, TX (US); Mark D. McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 11/459,954

(22) Filed: Jul. 26, 2006

(65) Prior Publication Data

US 2008/0027564 A1 Jan. 31, 2008

(51) Int. Cl.
*G06F 11/00* (2006.01)
(52) U.S. Cl. .................... 714/5; 714/7; 714/9
(58) Field of Classification Search .......... 714/5, 714/7, 9
See application file for complete search history.

(56) References Cited

U.S. PATENT DOCUMENTS

| | | | |
|---|---|---|---|
| 4,527,271 A | | 7/1985 | Hallee et al. |
| 6,148,352 A | * | 11/2000 | Coale et al. ............ 710/100 |
| 6,330,687 B1 | * | 12/2001 | Griffith ................. 714/6 |
| 6,766,491 B2 | * | 7/2004 | Busser ................. 714/770 |
| 6,874,100 B2 | * | 3/2005 | Rauscher .............. 714/6 |
| 7,062,591 B2 | * | 6/2006 | Pecone ................. 710/308 |
| 7,260,737 B1 | * | 8/2007 | Lent et al. ............. 714/5 |
| 7,320,083 B2 | * | 1/2008 | Davies et al. ........ 714/3 |
| 7,437,493 B2 | * | 10/2008 | Pecone ................. 710/74 |
| 7,480,815 B2 | * | 1/2009 | Rust et al. ............ 714/4 |
| 2002/0065962 A1 | | 5/2002 | Bakke et al. |
| 2003/0041201 A1 | * | 2/2003 | Rauscher ............. 710/300 |
| 2003/0065841 A1 | * | 4/2003 | Pecone ................. 710/105 |
| 2005/0060629 A1 | | 3/2005 | Cochran et al. |
| 2005/0081125 A1 | | 4/2005 | Cochran et al. |

OTHER PUBLICATIONS

Domberg et al., "IBM eserver p5 590 and 595 System Handbook", Redbooks, IBM Corporation, Mar. 2005, www.redbooks.ibm.com/redbooks/pdfs/sq249119.pdf, 316 pages, pp. 1 and 37-43 provided for relevence.*

(Continued)

*Primary Examiner*—Joshua A Lohn
(74) *Attorney, Agent, or Firm*—Francis Lammes; Stephen J. Walder, Jr.; Libby Z. Toub (57) ABSTRACT

A mechanism is provided for increased availability of input/output (I/O) drawers during concurrent I/O hub repair. The illustrative embodiments provide an alternative cabling scheme between an I/O planar and a plurality of I/O hubs that facilitates the I/O drawers being available even when an I/O hub fails. With this cabling scheme, a hypervisor or other virtualization mechanism configures routing tables in the firmware of the host system to cause data to be sent/received through the I/O hubs. In the event of a failure of an I/O hub, the routing tables may be updated by the hypervisor to utilize a different I/O hub coupled to the I/O drawer. By virtue of the modified cabling scheme of the illustrative embodiments, such updating of the routing tables allows I/O operations to continue at a single loop, or single barrel, throughput via the other I/O hub.

20 Claims, 4 Drawing Sheets

OTHER PUBLICATIONS

"Logical Partition Security in the IBM eserver pSeries 690", IBM Corporation, www-03.ibm.com/servers/eserver/pseries/hardware/whitepapers/lpar_security.html, 5 pages.

Domberg et al., "IBM eserver p5 590 and 595 System Handbook", Redbooks, IBM Corporation, Mar. 2005, www.redbooks.ibm.com/redbooks/pdfs/sg24119.pdf, 316 pages (first page submitted).

* cited by examiner

PROVIDING INCREASED AVAILABILITY OF I/O DRAWERS DURING CONCURRENT I/O HUB REPAIR

BACKGROUND

1. Technical Field

The present application relates generally to an improved data processing system and method. More specifically, the present application is directed to a system and method for providing increased availability of input/output (I/O) devices in the event of an I/O hub failure. The method also allows the I/O devices to be restored to the original bandwidth after a concurrent I/O hub repair.

2. Description of Related Art

Input/output (I/O) hubs are often used in server computing devices to allow multiple I/O devices to be connected to the server computing device and manage the I/O operations performed between the I/O devices and the server computing device's processors, memory, and other resources. For example, in the IBM eserver p5-590 and 595 server computing devices available from International Business Machines, Inc. of Armonk, N.Y., one or more GX+ I/O hub adapters are utilized to provide and manage multiple I/O devices connected to the server computing device.

Typically, such I/O hub adapters are provided in the host system and are coupled to remote I/O drawers, in which I/O adapters (e.g., PCI or PCI-X adapters) and/or disk devices may be installed, through cabling links, e.g., Remote Input/Output (RIO) cabling links. The I/O drawers typically contain two I/O planars having slots and/or disk bays into which I/O adapters and SCSI devices may be installed.

The connections between the I/O hub adapters and the remote I/O drawers are provided using cable loops which help to protect against a single point-of-failure resulting from an open, missing, or disconnected cable. Systems with non-looped configurations could experience a failure that results in a loss of I/O resources.

I/O drawers may be connected to the host system in either a single loop or dual loop mode. In a single loop, or "single barrel," mode, an entire I/O drawer is connected to the host system using one cable loop, with 2 ports. Planars in the I/O drawer are connected together using a short cable. Single loop connection requires one loop (2 ports) per I/O drawer.

Dual loop, or "double barrel," mode, connects each I/O planar in the drawer to the host system separately. Each I/O planar is connected to the host system using a separate cable loop. Dual loop connections require two loops (4 ports) per I/O drawer. The dual loop connection provides twice the bandwidth of the single loop connection. Thus, dual loop mode is typically utilized because it provides the maximum bandwidth between the I/O drawer and the host system.

While dual loop mode provides the maximum bandwidth between the I/O drawer and the host system, a problem exists in that if one I/O hub in the host system fails, one entire I/O planar becomes unavailable until the I/O hub is repaired. This can considerably reduce the I/O throughput, or bandwidth, of the host system when an entire I/O planar is placed out of service due to one failed I/O hub. While failed I/O hubs may be repaired concurrently with the operation of other I/O planars of the I/O drawer, the I/O planar coupled to the failed I/O hub cannot be concurrently used during the time between the failure of the I/O hub and completion of repairs on the I/O hub.

SUMMARY

The illustrative embodiments are directed to a system and method for providing increased availability of input/output (I/O) drawers during concurrent I/O hub repair. The illustrative embodiments provide an alternative cabling scheme between an I/O planar and a plurality of I/O hubs that facilitates the I/O planars in the I/O drawers being available even when an I/O hub coupled to an I/O planar fails. The alternate cabling scheme provides for a first port of a first I/O hub to be coupled to a first port host bridge of a first I/O planar and a first port of a second I/O hub to be coupled to a second port host bridge of the first I/O planar. A second port of the first I/O hub may be coupled to a first port host bridge of a second I/O planar. A second port of the second I/O hub may be coupled to a second port host bridge of the second I/O planar.

With this cabling scheme, a hypervisor or other virtualization mechanism configures routing tables in the firmware of the host system to cause data to be sent/received through the I/O hubs. That is, address ranges in the routing tables may be associated with identifiers of the I/O hubs to thereby route I/O operations associated with the particular address ranges to the associated I/O hubs. In the event of a failure of an I/O hub, the routing tables may be updated by the hypervisor to utilize a different I/O hub coupled to the I/O drawer.

By virtue of the modified cabling scheme of the illustrative embodiments, such updating of the routing tables allows I/O operations to continue at a single loop, or single barrel, throughput/bandwidth via the other, i.e. non-failing, I/O hub. Thus, while the I/O hubs are operating properly and there is no failure, a dual loop, or double barrel throughput or maximum bandwidth is achieved. However, when an I/O hub failure occurs, rather than making the I/O planars associated with the failed I/O hub completely unavailable, the cabling scheme of the illustrative embodiment allows for a fall-back to a single loop, or single barrel, throughput, i.e. a reduced bandwidth. Thus, the I/O planars in the I/O drawer are essentially available 100% of the time.

In one illustrative embodiment, a method, which may be implemented in a data processing system, is provided that comprises coupling a first I/O hub adapter of the data processing system to both a first I/O planar and a second I/O planar of an I/O drawer. A second I/O hub adapter of the data processing system may be coupled to both the first I/O planar and the second I/O planar of the I/O drawer. At least one routing table may be stored in the data processing system for associating at least one first address range to the first I/O hub adapter and at least one second address range to the second I/O hub adapter. Data may be routed through the first I/O hub adapter and the second I/O hub adapter based on the at least one routing table. A failure of the first I/O hub adapter may be detected and, in response to detecting the failure of the first I/O hub adapter, the at least one first address range may be associated with the second I/O hub adapter.

The coupling of the first I/O hub adapter to both the first I/O planar and the second I/O planar may comprise providing a communication connection between a first port of the first I/O hub adapter and a first port host bridge of the first I/O planar, and providing a communication connection between a second port of the first I/O hub adapter and a first port host bridge of the second I/O adapter. Coupling the second I/O hub adapter to both the first I/O planar and the second I/O planar may comprise providing a communication connection between a first port of the second I/O hub adapter and a second port host bridge of the first I/O planar, and providing a communication connection between a second port of the second I/O hub adapter and a second port host bridge of the second I/O planar. The communication connections between the first I/O hub adapter and the first and second I/O planars, and the communication connections between the second I/O hub adapter and the first and second I/O planars, may be RIO-2 cable connections. Links between the data processing system and the I/O drawer may have a first total bandwidth during normal operation. The method may further comprise detecting a failure of the first I/O hub adapter and reducing a total bandwidth of the links between the data processing system and the I/O drawer to a second total bandwidth in response to the detected failure of the first I/O hub adapter. The second total bandwidth is less than the first total bandwidth. For example, the second total bandwidth may be half the bandwidth of the first total bandwidth.

The method may further comprise detecting a completion of a concurrent repair operation on the first I/O hub adapter and returning the total bandwidth of the links between the data processing system and the I/O drawer to the first total bandwidth in response to detecting the completion of the concurrent repair operation.

In a further illustrative embodiment, a data processing system is provided that comprises a first I/O hub adapter coupled to both a first I/O planar and a second I/O planar of an I/O drawer, and a second I/O hub adapter coupled to both the first I/O planar and the second I/O planar of the I/O drawer. The data processing system may further comprise a routing table storage device that stores at least one routing table for associating at least one first address range to the first I/O hub adapter and at least one second address range to the second I/O hub adapter. The data processing system may also comprise a virtualization intermediary that routes data through the first I/O hub adapter and the second I/O hub adapter based on the at least one routing table. The virtualization intermediary may detect a failure of the first I/O hub adapter and, in response to detecting the failure of the first I/O hub adapter, may associate the at least one first address range with the second I/O hub adapter.

The first I/O hub adapter may be coupled to both the first I/O planar and the second I/O planar by providing a communication connection between a first port of the first I/O hub adapter and a first port host bridge of the first I/O planar, and providing a communication connection between a second port of the first I/O hub adapter and a first port host bridge of the second I/O adapter. The second I/O hub adapter may be coupled to both the first I/O planar and the second I/O planar by providing a communication connection between a first port of the second I/O hub adapter and a second port host bridge of the first I/O planar, and providing a communication connection between a second port of the second I/O hub adapter and a second port host bridge of the second I/O planar. The communication connections between the first I/O hub adapter and the first and second I/O planars, and the communication connections between the second I/O hub adapter and the first and second I/O planars, may be RIO-2 cable connections, for example.

Links between the data processing system and the I/O drawer may have a first total bandwidth during normal operation. However, in response to the virtualization intermediary detecting a failure of the first I/O hub adapter, a total bandwidth of the links between the data processing system and the I/O drawer may be reduced to a second total bandwidth which is less than the first total bandwidth. In response to the virtualization intermediary detecting a completion of a concurrent repair operation on the first I/O hub adapter, the total bandwidth of the links between the data processing system and the I/O drawer may be returned to the first total bandwidth. The second total bandwidth may be half the bandwidth of the first total bandwidth, for example.

In a further illustrative embodiment, a computer program product comprising a computer usable medium having a computer readable program is provided. The computer readable program, when executed on a computing device, causes the computing device to detect a failure of a first I/O hub adapter of the computing device and modify one or more routing table data structures to associate an address range originally associated with the failed first I/O hub adapter to a non-failed second I/O hub adapter coupled to a same I/O drawer as the failed first I/O hub adapter. The computer readable program may further cause the computing device to route data through the I/O drawer using the modified one or more routing table data structures and the non-failed second I/O hub adapter.

The computer readable program may further cause the computing device to detect completion of a concurrent repair operation on the failed first I/O hub adapter and modify the one or more routing table data structures to associate the address range with a repaired I/O hub adapter in response to detection of the completion of the concurrent repair operation. The computer readable program may further cause the computing device to route data through the I/O drawer using the twice modified one or more routing table data structures and the repaired I/O hub adapter.

The first I/O hub adapter may be coupled to both a first I/O planar and a second I/O planar of the I/O drawer. Similarly, the second I/O hub adapter may be coupled to both the first I/O planar and the second I/O planar of the I/O drawer.

Prior to detection of the failed first I/O hub adapter, the I/O drawer may operate at a first bandwidth. After detection of the failed first I/O hub adapter, the I/O drawer may operate at a second bandwidth lower than the first bandwidth.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide a system and method for providing increased availability of input/output (I/O) drawers during concurrent I/O hub repair. More specifically, the illustrative embodiments provide a cabling scheme that facilitates the continued use of an I/O planar when a failure of an I/O hub coupled to the I/O planar occurs. The illustrative embodiments further provide a mechanism for modifying routing tables in firmware of the host system in the event of an I/O hub failure so that I/O data is routed to a different I/O hub coupled to the I/O drawer.

The mechanisms of the illustrative embodiments may be implemented in any computing system having I/O drawers and I/O hubs coupled to the I/O drawers remotely via a plurality of cables. In the illustrative embodiments described herein, the computing system is an IBM eserver p5-590 or p5-595 server computing system available from International Business Machines, Inc. of Armonk, N.Y. While an IBM eserver p5-590 or p5-595 server computing system is utilized in the description of the illustrative embodiments herein, it should be appreciated that the illustrative embodiments are not limited to such.

Figure 1:
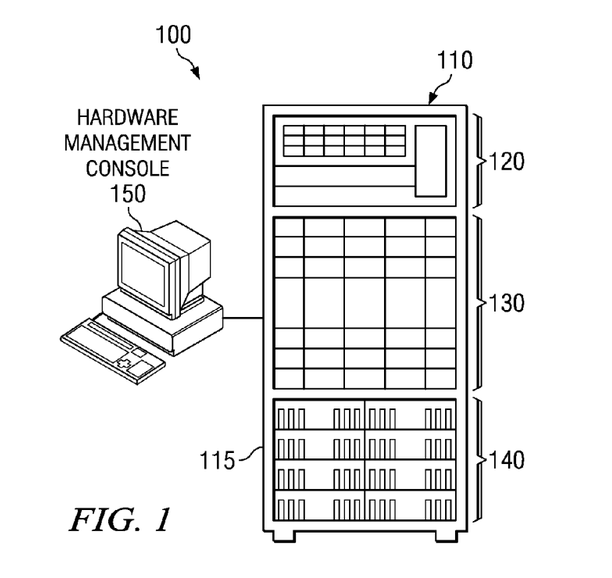
FIG. 1 is an exemplary diagram illustrating a server computing system in which exemplary aspects of the illustrative embodiments may be implemented.

FIG. 1 is an exemplary diagram illustrating a server computing system in which exemplary aspects of the illustrative embodiments may be implemented. The particular server computing system depicted in FIG. 1 is an IBM eserver p5-590 server computing system. As shown in FIG. 1, the server computing system 100 includes server computing device 110 having a system frame 115 into which a plurality of operating components are installed. These operating components include a bulk power assembly 120, a central electronics complex (CEC) 130 in which the processors, memory, and I/O hub adapters are provided, and a plurality of I/O drawers 140. The server computing system 100 further comprises a hardware management console (HMC) computing device 150 which runs a HMC program for configuring and managing the hardware of the server computing device 115.

The I/O drawers 140 each have two I/O planars (not shown) which each have a plurality of ports and/or SCSI interfaces with which I/O devices may be coupled, e.g., PCI or PCI-X adapters, hard disks, and the like. The I/O planars of the I/O drawers 140 are coupled to the I/O hub adapters of the CEC 130 via communication cable links, e.g., RIO-2 cable links. The CEC 130, for purposes of the present description, may constitute the "host system," with the I/O drawers being remote from the host system such that communication between the host system and the I/O devices coupled to the I/O drawers 140 is facilitated by these cable links.

In the server computing system 100 of FIG. 1, the connections between the I/O hub adapters of the CEC 130 and the remote I/O drawers 140 are provided using cable loops (not shown) which help to protect against a single point-of-failure resulting from an open, missing, or disconnected cable. That is, by providing a cable loop, if one portion of the loop is not available, the other portion of the loop may still be utilized to provide communication between the I/O devices coupled to the I/O drawers 140 and the CEC or host system 130.

Figure 2:
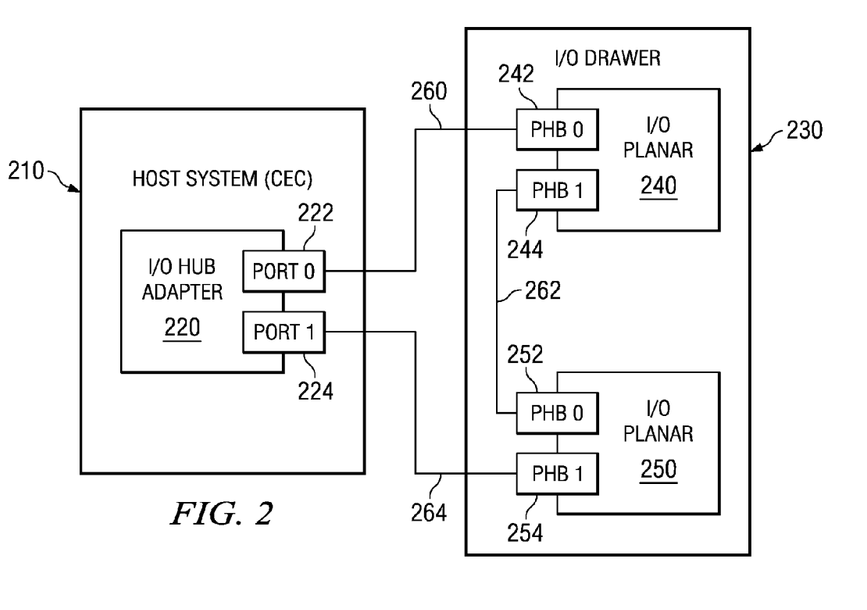
FIG. 2 is an exemplary diagram illustrating a single loop cabling scheme in accordance with a known arrangement.

I/O drawers 140 may be connected to the CEC or host system 130 in either a single loop or dual loop mode. FIG. 2 is an exemplary diagram illustrating a single loop cabling scheme in accordance with a known arrangement. As shown in FIG. 2, a host system or CEC 210 includes one or more I/O hub adapters 220, each I/O hub adapter having at least two ports 222 and 224. The I/O drawer 230 includes at least two I/O planars 240 and 250, each having at least two port host bridges 242, 244, 252, and 254.

In a single loop, or "single barrel," cabling scheme, the entire I/O drawer 230 is connected to the host system 210 using one cable loop, with two port host bridges. Planars 240 and 250 in the I/O drawer 230 are connected together using a short cable 262 via port host bridges 244 and 252. Single loop connection requires one loop (2 ports) per I/O drawer 230. That is, as depicted in FIG. 2, a single cable loop comprises the cable connection 260 between port 0 222 of the I/O hub adapter 220 and port host bridge 0 242 of the I/O planar 240, the cable connection 262 between port host bridges 244 and 252 of I/O planars 240 and 250, and the cable connection 264 between port 1 of the I/O hub adapter 224 and port host bridge 1 254 of the I/O planar 250. The cable connections described herein may be, for example, RIO-2 cable links, or the like.

Figure 3:
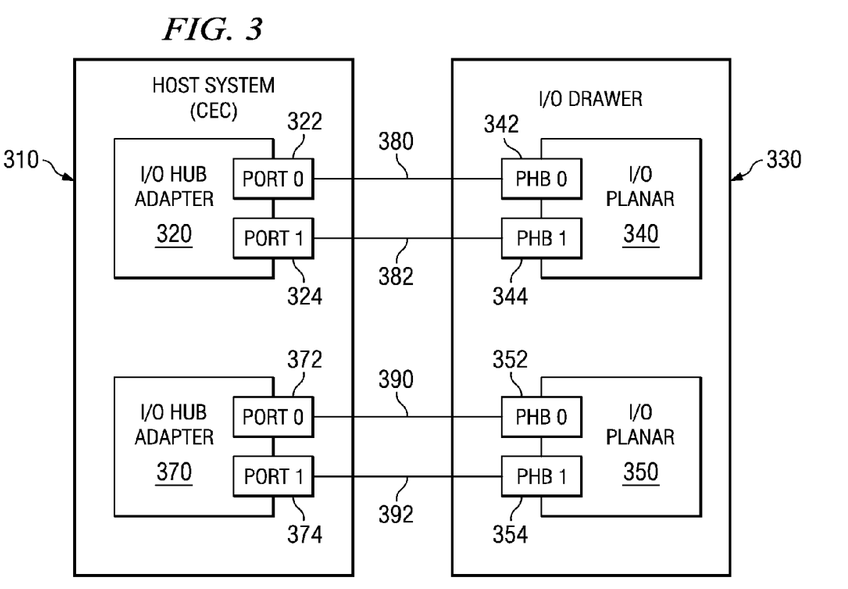
FIG. 3 is an exemplary diagram illustrating a double loop cabling scheme in accordance with a known arrangement.

The dual loop, or "double barrel," cabling scheme, connects each I/O planar 240 and 250 in the I/O drawer 230 to the host system 210 separately, as shown in FIG. 3. Each I/O planar 340 and 350 is connected to the host system 310 using a separate cable loop. For example, I/O planar 340 is connected to a first I/O hub adapter 320 via a first cable connection 380 between port 0 322 of I/O hub adapter 320 and port host bridge 0 342 of the I/O planar 340. The I/O planar 340 is further connected to the first I/O hub adapter 320 via port 1 324 of the I/O hub adapter 320 and port host bridge 1 344 of the I/O planar 340. Similarly, the I/O planar 350 is connected to a second I/O hub adapter 370 of the host system 310 via a cable connection between port 0 372 of the I/O hub adapter 370 and port host bridge 0 352 of the I/O planar 350. Moreover, the I/O planar 350 is further connected to the second I/O hub adapter 370 via a cable connection between port 1 374 of the I/O hub adapter 370 and port host bridge 1 354 of the I/O planar 350.

As shown in FIG. 3, the dual loop connections require two loops (4 ports) per I/O drawer 330, rather than the 2 ports utilized in the single loop connection shown in FIG. 2. Thus, the dual loop connection provides twice the bandwidth of the single loop connection. Therefore, dual loop cabling schemes are typically utilized, over the single loop cabling scheme, because it provides the maximum bandwidth between the I/O drawer 330 and the host system 310. While dual loop mode provides the maximum bandwidth between the I/O drawer 330 and the host system 310, a problem exists in that if the I/O hub adapter, e.g. I/O hub 320, of the host system 310 fails, I/O planar 340 becomes unavailable until the I/O hub adapter 320 is repaired.

Concurrent repair of an I/O hub adapter 320 with operation of other I/O hub adapters in the host system requires that the failed I/O hub adapter 320 be physically replaced and a repair procedure be initiated on the HMC console. The firmware of the host system then powers on the new I/O hub adapter, runs built-in self tests (BISTs), and initializes the new I/O hub adapter. If the new I/O hub adapter passes these tests and initialization successfully, the firmware of the host system will notify the hypervisor, or other virtualization mechanism being used, of the new I/O hub adapter. The hypervisor, or virtualization mechanism, may then set up the routing tables to utilize the new I/O hub adapter and will begin to use the new I/O hub adapter. During this entire time, the I/O planar in the I/O drawer is not operational. This can considerably reduce the I/O throughput or bandwidth of the host system 310 when an entire I/O planar 340 is placed out of service due to one failed I/O hub adapter 320.

The illustrative embodiments provide an alternative cabling scheme that, along with proper modification of routing tables in the firmware of the host system upon detection of a failed I/O hub adapter, allow the I/O planar of an I/O drawer associated with a failed I/O hub adapter to remain in an operational state while the I/O hub adapter is concurrently repaired. With this alternative cabling scheme, double loop throughput, or maximum bandwidth, is achieved when there is no I/O hub adapter failure associated with I/O hub adapters coupled to the I/O drawer. In the event of an I/O hub adapter failure, however, the I/O drawer may be failed back to a single loop throughput, or reduced bandwidth, and thereby remain operational in a lower bandwidth configuration while repairs to the failed I/O hub adapter are made. Once the I/O hub adapter is repaired, the I/O drawer may be returned to a double loop operation and thus, return to a double loop throughput, or maximum bandwidth.

Figure 4:
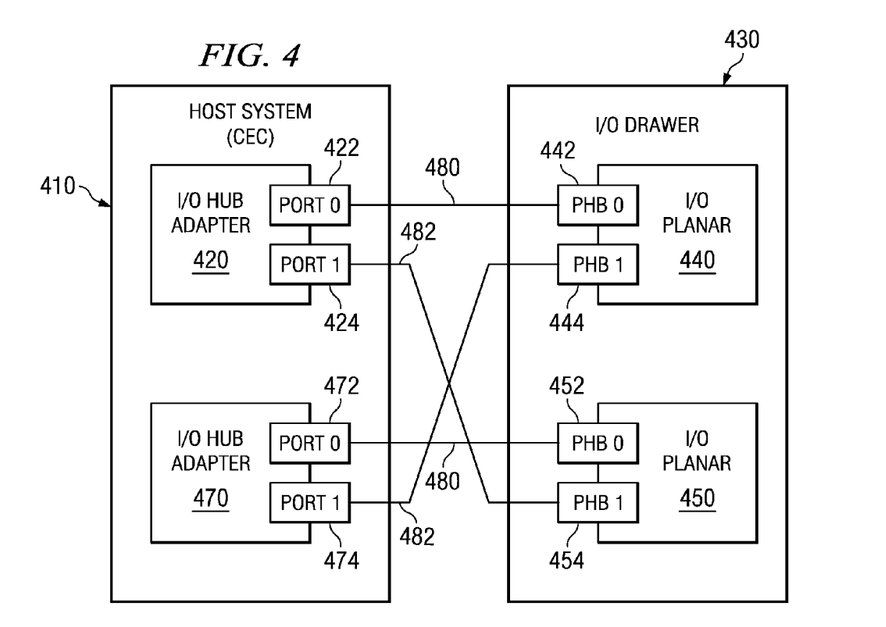
FIG. 4 is an exemplary diagram illustrating a cabling scheme in accordance with one illustrative embodiment.

FIG. 4 is an exemplary diagram illustrating a cabling scheme in accordance with one illustrative embodiment. As shown in FIG. 4, this new cabling scheme causes each I/O hub adapter to be coupled to more than one I/O planar in the I/O drawer. Moreover, each I/O planar in the I/O drawer is coupled to more than one I/O hub adapter in the host system. In this way, when an I/O hub adapter fails, the data traffic through this I/O hub adapter may be rerouted, by modification of the routing tables, such that it is directed to the other of the two I/O hub adapters. The data may then be directed to the I/O planar associated with the failed I/O hub adapter through a cross connection from the still functioning I/O hub adapter.

As shown in FIG. 4, a first I/O hub adapter 420 of the host system or CEC 410 has two ports, port 0 422 and port 1 424. Port 0 422 of the first I/O hub adapter 420 is connected, by way of cable link 480, to port host bridge 0 442 of a first I/O planar 440 of the I/O drawer 430. Port 1 424 of the first I/O hub adapter 420 is connected, by way of cable line 482, to port host bridge 1 454 of a second I/O planar 450 of the I/O drawer 430.

Similarly, a second I/O hub adapter 470 of the host system or CEC 410 has two ports, port 0 472 and port 1 474. Port 0 472 of the second I/O hub adapter 470 is connected, by way of cable link 490, to port host bridge 0 452 of the second I/O planar 450 of the I/O drawer 430. Port 1 474 of the second I/O hub adapter 470 is connected, by way of cable line 492, to port host bridge 1 444 of the first I/O planar 440 of the I/O drawer 430.

The cross connections of I/O hub adapter 420 to I/O planar 450 and I/O hub adapter 470 to I/O planar 440 provide a communication path through which data may flow even in the event of a failure of one of the I/O hub adapters 420 and 470. For example, in the event of a failure of I/O hub adapter 420, I/O devices coupled to the I/O planar 440 may still communicate with the host system 410 and vice versa via port 1 474 of the I/O hub adapter 470.

Thus, during normal operation in which there is no failure of an I/O hub adapter, data may flow to and from the host system 410 via the I/O hub adapter 420 to I/O devices coupled to the I/O planars 440 and 450 through cable links 480 and 482. Hence, the host system 410 may communicate with I/O devices coupled to both the I/O planars 440 and 450 via the I/O hub adapter 420. Similarly, the host system 410 may communicate with I/O devices coupled to both the I/O planars 440 and 450 via the I/O hub adapter 470 and cable links 490 and 492. Thus, the host system 410 may have twice the data throughput, as in the double loop or double barrel cabling scheme previously described above, since communication is facilitated through both I/O hub adapters 420 and 470 to both I/O planars 440 and 450.

In the event of a failure of the I/O hub adapter 420, communication between the host system 410 and the I/O planars 440 and 450 via the I/O hub adapter 420 is no longer possible until the I/O hub adapter 420 is concurrently repaired. While the I/O hub adapter 420 is being repaired, with the illustrative embodiments, communication between the I/O devices coupled to the I/O planars 440 and 450 may still be performed via the I/O hub adapter 470 and cable links 490 and 492. While communication is still possible between the I/O devices and the host system 410, this communication is performed at a reduced throughput due to the fact that the communication is only being performed through one I/O hub adapter 470 via a single port host bridge 444 and 452 on each of I/O planars 440 and 450.

Figure 5:
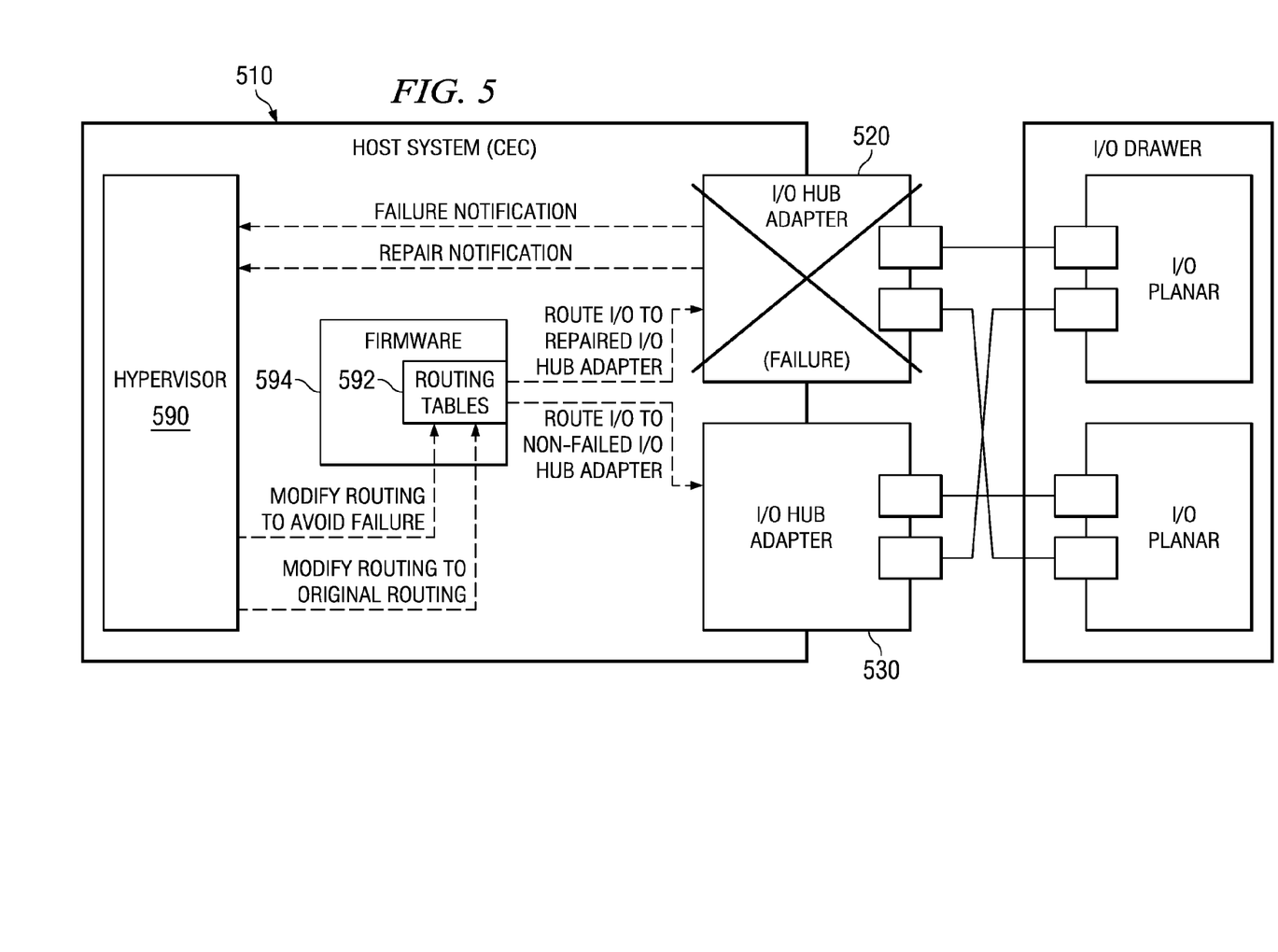
FIG. 5 is an exemplary diagram illustrating an operation for routing I/O data in the event of an I/O hub failure in accordance with one illustrative embodiment.

FIG. 5 is an exemplary diagram illustrating an operation for routing I/O data in the event of an I/O hub failure in accordance with one illustrative embodiment. In addition to providing the cabling scheme shown in FIG. 4, the illustrative embodiments utilize a mechanism for modifying routing tables in firmware of the host system or CEC in the event of an I/O hub adapter failure so that the data that would be directed to the failed I/O hub adapter is rerouted to another I/O hub adapter coupled to the same I/O drawer that is still operational. These routing tables associated particular memory address spaces with particular I/O hub adapters. Thus, by modifying these routing tables to associate different memory address spaces with different I/O hub adapters, data transactions directed to/from a particular memory address may be re-routed through a different pathway between the host system and the I/O devices.

As shown in FIG. 5, when an I/O hub adapter fails, e.g., I/O hub adapter 520 fails, a notification of this failure is provided to a hypervisor 590 or other virtualization intermediary, running in the host system 510, which is responsible for creating and managing the routing tables 592 in the firmware 594 of the host system 510. In response to receiving the notification of the failure, the hypervisor 590 modifies the routing tables 592 in the firmware 594 so that the memory address ranges associated with the failed I/O hub adapter 520 are associated with I/O hub adapter 530 which is still operational. Such association may be performed, for example, by associating an identifier of the I/O hub adapter 530 with address range entries in the routing tables 592. For example, identifiers of the I/O hub adapters 520 and 530 may be stored in hardware registers of the I/O hub adapters 520 and 530 and may be used to associate memory address ranges with these I/O hub adapters 520 and 530.

By associating memory address ranges with the operating I/O hub adapter 530, transactions from/to memory addresses in these memory address ranges may be routed to the I/O hub adapter 530 rather than I/O hub adapter 520. The original mapping of address ranges to I/O hub adapter 520 may be maintained either in the routing tables 592 or in another data structure from which the original mapping of address ranges may be restored once the repair of the failed I/O hub adapter 520 is complete. Thus, when the repair of the failed I/O hub adapter 520 is complete, the completion is notified to the hypervisor 590 which then restores the original address range mapping to the routing tables 592 in the firmware 594, possibly using a new I/O hub adapter identifier if the I/O hub adapter is replaced during the repair procedure.

Figure 6:
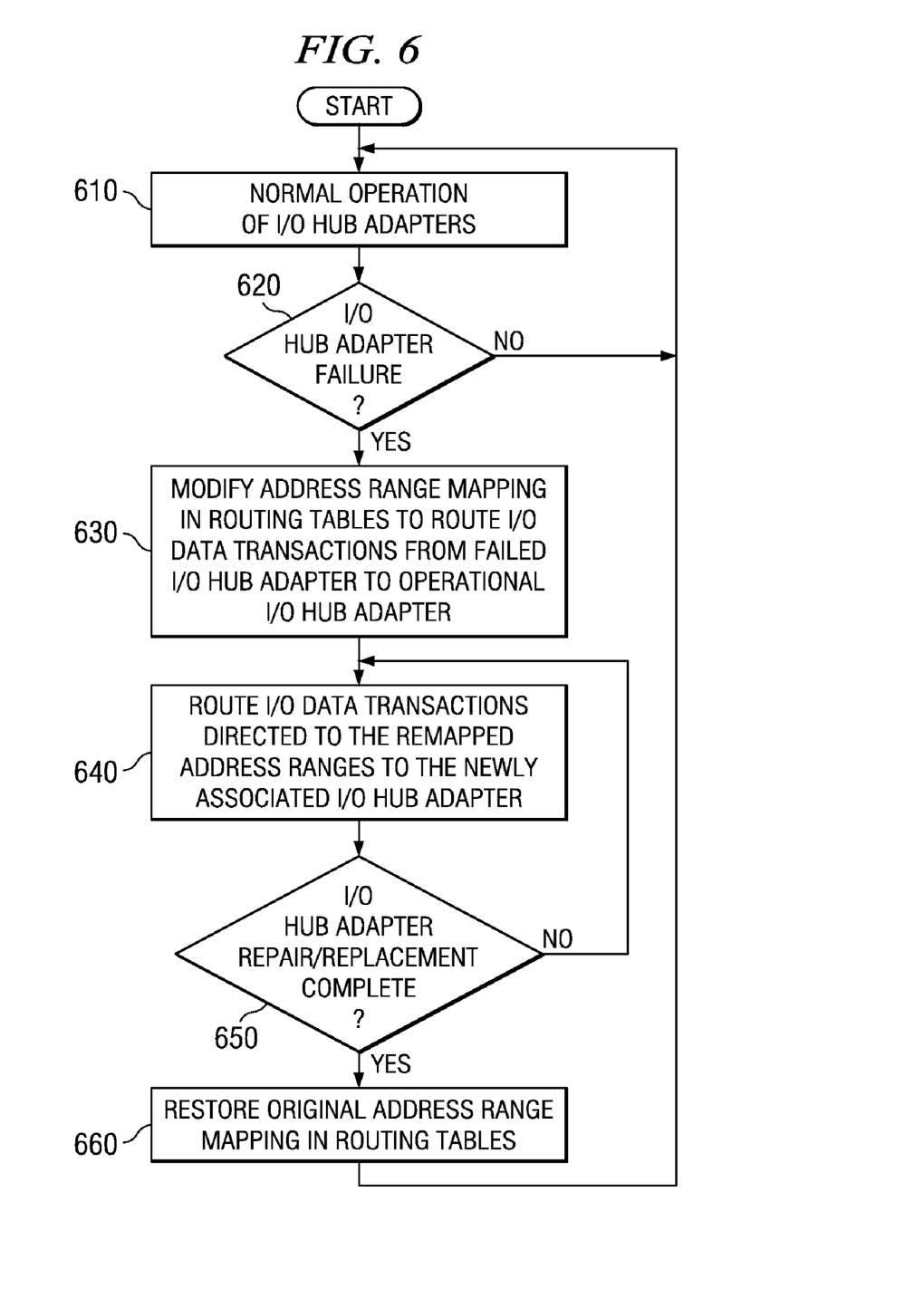
FIG. 6 is a flowchart outlining an exemplary operation for routing I/O data using the cabling scheme of the illustrative embodiments.

FIG. 6 is a flowchart outlining an exemplary operation for routing I/O data using the cabling scheme of the illustrative embodiments. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

The operation outlined in FIG. 6 assumes a cabling scheme such as that described with regard to FIG. 4 above. As shown in FIG. 6, the operation starts with the normal operation of the I/O hub adapters (step 610). During such normal operation, data transactions occur between the I/O hub adapters and a plurality of I/O planars of an I/O drawer via the cross-cabling scheme.

A determination is made by the hypervisor, or other virtualization intermediary, as to whether an I/O hub adapter has failed (step 620). If an I/O hub adapter has not failed, the operation returns to step 610. If an I/O hub adapter has failed, the hypervisor modifies the address range mapping in the routing tables to route data transactions associated with an address range corresponding to the failed I/O hub adapter to a still operational I/O hub adapter coupled to the same I/O drawer (step 630). Routing of data transactions to the remapped address ranges are then made to the newly associated I/O hub adapter (step 640).

A determination is made by the hypervisor as to whether the failed I/O hub adapter has been repaired (step 650). If the repair is not yet completed, the operation returns to step 640. If the repair has been completed, then the hypervisor restores the original address range mapping to the routing tables, possibly using a new I/O hub adapter identifier if the I/O hub adapter was replaced during the repair operation (step 660). The operation then returns to step 610 where data transactions associated with the address ranges corresponding to the repaired/replaced I/O hub adapter are performed through the repaired/replaced I/O hub adapters.

Thus, the illustrative embodiments provide a system and method for maintaining the operational state of an I/O planar in an I/O drawer of a computing system even during the failure of an I/O hub adapter coupled to the I/O planar. The illustrative embodiments make possible the maximized throughput of the I/O drawers while no failures of I/O hub adapters are experienced. In the event of an I/O hub adapter failure, the throughput is reduced to half of the maximized throughput, however the operation of the I/O drawer is maintained.

It should be appreciated that elements of the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, elements of the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, comprising:
coupling a first I/O hub adapter, in a host system of the data processing system, to both a first I/O planar and a second I/O planar of an I/O drawer that is remote from the host system;
coupling a second I/O hub adapter, in the host system of the data processing system, to both the first I/O planar and the second I/O planar of the I/O drawer;
storing at least one routing table, in the host system in the data processing system, for associating at least one first address range to the first I/O hub adapter and at least one second address range to the second I/O hub adapter;
during normal operation, routing data through the first I/O hub adapter to both the first I/O planar and the second I/O planar of the I/O drawer based on the at least one routing table; and
during the normal operation, routing additional data through the second I/O hub adapter to both the first I/O planar and the second I/O planar of the I/O drawer based on the at least one routing table.

2. The method of claim 1, further comprising:
detecting a failure of the first I/O hub adapter;
in response to detecting the failure of the first I/O hub adapter, associating the at least one first address range with the second I/O hub adapter; and
routing data through the second I/O hub adapter to both the first I/O planar and the second I/O planar of the I/O drawer.

3. The method of claim 1, wherein coupling the first I/O hub adapter to both the first I/O planar and the second I/O planar comprises:
providing a communication connection between a first port of the first I/O hub adapter and a first port host bridge of the first I/O planar; and
providing a communication connection between a second port of the first I/O hub adapter and a first port host bridge of the second I/O planar.

4. The method of claim 3, wherein coupling the second I/O hub adapter to both the first I/O planar and the second I/O planar comprises:
providing a communication connection between a first port of the second I/O hub adapter and a second port host bridge of the first I/O planar; and
providing a communication connection between a second port of the second I/O hub adapter and a second port host bridge of the second I/O planar.

5. The method of claim 1, wherein links between the data processing system and the I/O drawer have a first total bandwidth during normal operation, and wherein the method further comprises:
detecting a failure of the first I/O hub adapter; and
reducing a total bandwidth of the links between the data processing system and the I/O drawer to a second total bandwidth, which is less than the first total bandwidth, in response to the detected failure of the first I/O hub adapter.

6. The method of claim 5, further comprising:
detecting a completion of a concurrent repair operation on the first I/O hub adapter; and
returning the total bandwidth of the links between the data processing system and the I/O drawer to the first total bandwidth in response to detecting the completion of the concurrent repair operation.

7. The method of claim 5, wherein the second total bandwidth is half the bandwidth of the first total bandwidth.

8. The method of claim 1, further comprising:
detecting a failure of the second I/O hub adapter;
in response to detecting the failure of the second I/O hub adapter and in response to the first I/O adapter being non-failed, associating the at least one second address range with the first I/O hub adapter; and
routing the additional data through the first I/O hub adapter to both the first I/O planar and the second I/O planar of the I/O drawer.

9. A data processing system, comprising:
a first I/O hub adapter, in a host system, coupled to both a first I/O planar and a second I/O planar of an I/O drawer that is remote from the host system;
a second I/O hub adapter, in the host system, coupled to both the first I/O planar and the second I/O planar of the I/O drawer;
a routing table storage device, in the host system, that stores at least one routing table for associating at least one first address range to the first I/O hub adapter and at least one second address range to the second I/O hub adapter;
a virtualization intermediary that, during normal operation, routes data through the first I/O hub adapter to both the first I/O planar and the second I/O planar of the I/O drawer based on the at least one routing table; and
during the normal operation, routes additional data through the second I/O hub adapter to both the first I/O planar and the second I/O planar of the I/O drawer based on the at least one routing table.

10. The data processing system of claim 9, wherein the virtualization intermediary:
detects a failure of the first I/O hub adapter;
in response to detecting the failure of the first I/O hub adapter, associates the at least one first address range with the second I/O hub adapter; and
routes data through the second I/O hub adapter to both the first I/O planar and the second I/O planar of the I/O drawer.

11. The data processing system of claim 9, wherein the first I/O hub adapter is coupled to both the first I/O planar and the second I/O planar by providing a communication connection between a first port of the first I/O hub adapter and a first port host bridge of the first I/O planar, and providing a communication connection between a second port of the first I/O hub adapter and a first port host bridge of the second I/O planar.

12. The data processing system of claim 11, wherein the second I/O hub adapter is coupled to both the first I/O planar and the second I/O planar by providing a communication connection between a first port of the second I/O hub adapter and a second port host bridge of the first I/O planar, and providing a communication connection between a second port of the second I/O hub adapter and a second port host bridge of the second I/O planar.

13. The data processing system of claim 9, wherein links between the data processing system and the I/O drawer have a first total bandwidth during normal operation, and wherein, in response to the virtualization intermediary detecting a failure of the first I/O hub adapter, a total bandwidth of the links between the data processing system and the I/O drawer is reduced to a second total bandwidth which is less than the first total bandwidth.

14. The data processing system of claim 13, wherein, in response to the virtualization intermediary detecting a completion of a concurrent repair operation on the first I/O hub adapter, the total bandwidth of the links between the data processing system and the I/O drawer is returned to the first total bandwidth.

15. The data processing system of claim 13, wherein the second total bandwidth is half the bandwidth of the first total bandwidth.

16. The data processing system of claim 9, wherein the virtualization intermediary:
detects a failure of the second I/O hub adapter;
in response to detecting the failure of the second I/O hub adapter and in response to the first I/O adapter being non-failed, associates the at least one second address range with the first I/O hub adapter; and
routes the additional data through the first I/O hub adapter to both the first I/O planar and the second I/O planar of the I/O drawer.

17. A computer program product comprising a computer readable storage medium having a computer readable program stored therein, wherein the computer readable program, when executed on a computing device, causes the computing device to:

during normal operation, route data through a first I/O hub adapter to both a first I/O planar and a second I/O planar of an I/O drawer based on at least one routing table;

during the normal operation, route additional data through a second I/O hub adapter to both the first I/O planar and the second I/O planar of the I/O drawer based on the at least one routing table;

detect a failure of the first I/O hub adapter of the computing device;

modify one or more routing table data structures to associate an address range originally associated with the failed first I/O hub adapter to the second I/O hub adapter of the computing device, wherein the second I/O adapter is non-failed, wherein the I/O drawer is remote from the computing device; and route data to the I/O drawer using the modified one or more routing table data structures and the second I/O hub adapter, wherein the data routed through the second I/O hub adapter is routed to both the first I/O planar and the second I/O planar of the I/O drawer.

18. The computer program product of claim 17, wherein the computer readable program further causes the computing device to:

detect completion of a concurrent repair operation on the failed first I/O hub adapter;

modify the one or more routing table data structures to associate the address range with a repaired I/O hub adapter in response to detection of the completion of the concurrent repair operation; and route data through the I/O drawer using the twice modified one or more routing table data structures and the repaired I/O hub adapter, wherein the data routed through the repaired I/O hub adapter is routed to both the first I/O planar and the second I/O planar of the I/O drawer.

19. The computer program product of claim 17, wherein the first I/O hub adapter is coupled to both the first I/O planar and the second I/O planar of the I/O drawer, and the second I/O hub adapter is coupled to both the first I/O planar and the second I/O planar of the I/O drawer.

20. The computer program product of claim 17, wherein prior to detection of the failed first I/O hub adapter, the I/O drawer operates at a first bandwidth, and after detection of the failed first I/O hub adapter, the I/O drawer operates at a second bandwidth lower than the first bandwidth.

* * * * *